US011719531B2

(12) United States Patent
Furman

(10) Patent No.: US 11,719,531 B2
(45) Date of Patent: Aug. 8, 2023

(54) METHODS AND SYSTEMS OF HOLOGRAPHIC INTERFEROMETRY

(71) Applicant: RD Synergy Ltd., Nes Ziona (IL)

(72) Inventor: Dov Furman, Rehovot (IL)

(73) Assignee: RD Synergy Ltd., Nes Ziona (IL)

( * ) Notice: Subject to any disclaimer, the term of this patent is extended or adjusted under 35 U.S.C. 154(b) by 54 days.

(21) Appl. No.: 17/288,614

(22) PCT Filed: Oct. 30, 2019

(86) PCT No.: PCT/IL2019/051174
§ 371 (c)(1),
(2) Date: Apr. 26, 2021

(87) PCT Pub. No.: WO2020/089900
PCT Pub. Date: May 7, 2020

(65) Prior Publication Data
US 2022/0018649 A1    Jan. 20, 2022

Related U.S. Application Data

(60) Provisional application No. 62/752,408, filed on Oct. 30, 2018.

(51) Int. Cl.
*G01B 9/021*      (2006.01)
*G02B 5/30*       (2006.01)
(Continued)

(52) U.S. Cl.
CPC ......... *G01B 9/021* (2013.01); *G01B 9/0209* (2013.01); *G01B 9/02047* (2013.01);
(Continued)

(58) Field of Classification Search
CPC .. G01B 9/0209; G01B 9/02097; G01B 9/021; G01B 2290/70; G03H 1/0443; G02B 5/3025
See application file for complete search history.

(56) References Cited

U.S. PATENT DOCUMENTS 4,171,908 A * 10/1979 Robert ................... G01L 1/241
250/225
4,478,481 A    10/1984 Fusek et al.
(Continued)

FOREIGN PATENT DOCUMENTS

CN         1589422       3/2005
CN       101762842       6/2010
(Continued)

OTHER PUBLICATIONS

Office Action dated Jun. 3, 2022 From the Israel Patent Office Re. Application No. 271219. (4 Pages).
(Continued)

*Primary Examiner* — Michael A Lyons

(57) ABSTRACT

A holographic interferometer, comprising: an imaging device capturing an interference pattern created by at least two polarized light beams; a structured phase retardation element located in an optical path of at least one polarized light beam of the at least two polarized light beams; and a polarizer located between the imaging device and the structured phase retardation element, the polarizer projects each polarization of each of the at least two polarized light beams on a single axis to create the interference pattern on the imaging device.

15 Claims, 12 Drawing Sheets

(51) Int. Cl.
  *G01B 9/02*      (2022.01)
  *G01B 9/0209*    (2022.01)
  *G03H 1/04*      (2006.01)
  *G01B 9/02097*   (2022.01)

(52) U.S. Cl.
  CPC ....... *G01B 9/02097* (2013.01); *G02B 5/3025* (2013.01); *G03H 1/0443* (2013.01); *G01B 2290/70* (2013.01)

(56) References Cited

U.S. PATENT DOCUMENTS

| | | | |
|---|---|---|---|
| 4,602,843 | A | 7/1986 | Glaser-Inbari |
| 4,792,197 | A | 12/1988 | Inoue et al. |
| 5,028,134 | A * | 7/1991 | Bulpitt .................. G01J 3/0224 359/490.02 |
| 5,046,793 | A | 9/1991 | Hockley et al. |
| 5,515,183 | A | 5/1996 | Hashimoto |
| 6,275,623 | B1 * | 8/2001 | Brophy ................ G02B 6/2706 385/11 |
| 7,362,449 | B2 | 4/2008 | Dubois et al. |
| 7,471,430 | B1 | 12/2008 | Andersen |
| 7,609,384 | B2 | 10/2009 | Roosen et al. |
| 8,040,521 | B2 | 10/2011 | Pfaff |
| 10,725,428 | B2 | 7/2020 | Furman |
| 10,830,709 | B2 * | 11/2020 | Smith ................. G01B 9/02011 |
| 2005/0030603 | A1 | 2/2005 | Takemori et al. |
| 2006/0109482 | A1 | 5/2006 | Duval et al. |
| 2006/0152732 | A1 | 7/2006 | Roosen et al. |
| 2007/0211256 | A1 | 9/2007 | Medower et al. |
| 2008/0094600 | A1 | 4/2008 | Freimann |
| 2008/0304120 | A1 | 12/2008 | Hayashida et al. |
| 2009/0141325 | A1 * | 6/2009 | Sato ...................... G11B 7/128 359/21 |
| 2011/0237999 | A1 | 9/2011 | Muller |
| 2011/0255097 | A1 | 10/2011 | Golan et al. |
| 2012/0081684 | A1 | 4/2012 | Den Oef et al. |
| 2013/0003073 | A1 | 1/2013 | Yu et al. |
| 2014/0320865 | A1 | 10/2014 | Knuttel |
| 2015/0098066 | A1 | 4/2015 | Jurbergs |
| 2015/0205260 | A1 | 7/2015 | Awatsuji et al. |
| 2015/0253197 | A1 | 9/2015 | Okamoto et al. |
| 2017/0003650 | A1 | 1/2017 | Moser et al. |
| 2017/0108829 | A1 | 4/2017 | Kim |
| 2017/0314914 | A1 | 11/2017 | Chalmers et al. |
| 2018/0348703 | A1 | 12/2018 | Furman |
| 2019/0250392 | A1 * | 8/2019 | Cuche .................. G03H 1/0005 |
| 2020/0141715 | A1 | 5/2020 | Furman |

FOREIGN PATENT DOCUMENTS

| | | | |
|---|---|---|---|
| CN | 201508161 | | 6/2010 |
| CN | 102393569 | | 3/2012 |
| CN | 106164784 | | 11/2016 |
| CN | 107421437 | | 12/2017 |
| CN | 107615005 | | 1/2018 |
| CN | 108303020 | | 7/2018 |
| EP | 1411321 | | 4/2004 |
| EP | 2965852 | A1 * | 1/2016 ........... B23K 26/064 |
| JP | 4-204032 | | 7/1992 |
| JP | 08-219718 | | 8/1996 |
| JP | 2002-206914 | | 7/2002 |
| JP | 2003-302205 | | 10/2003 |
| JP | 2013-124992 | | 6/2013 |
| WO | WO 2018/225068 | | 12/2018 |
| WO | WO 2020/089900 | | 5/2020 |

OTHER PUBLICATIONS

International Preliminary Report on Patentability dated May 14, 2021 From the International Bureau of WIPO Re. Application No. PCT/IL2019/051174. (6 Pages).
Supplementary European Search Report and the European Search Opinion dated Sep. 15, 2022 From the European Patent Office Re. Application No. 19878638.6. (11 Pages).
Jansen "Instantaneous Phase Shifting Interfeometer Concept", Development of a Wafer Geometry Measuring System: A Double Sided Stitching Interferometer, XP002513343, Technische Universiteit Eindhoven, NL, Chap.4.2: 91-106, Jan. 2006.
Notification of Office Action and Search Report dated Jun. 27, 2022 From the State Intellectual Property Office of the People's Republic of China Re. Application No. 201980071824.9. (10 Pages).
Notice of Reasons for Rejection dated Apr. 5, 2022 From the Japan Patent Office Re. Application No. 2019-568108. (3 Pages).
Translation dated Apr. 27, 2022 of Notice of Reasons for Rejection dated Apr. 5, 2022 From the Japan Patent Office Re. Application No. 2019-568108. (3 Pages).
International Preliminary Report on Patentability dated Dec. 19, 2019 From the International Bureau of WIPO Re. Application No. PCT/IL2018/050617. (8 Pages).
International Search Report and the Written Opinion dated Oct. 1, 2018 From the International Searching Authority Re. Application No. PCT/IL2018/050617. (13 Pages).
International Search Report and the Written Opinion dated Mar. 12, 2020 From the International Searching Authority Re. Application No. PCT/IL2019/051174. (10 Pages).
Notice of Allowance dated Apr. 17, 2020 from the Re. U.S. Appl. No. 15/614,687. (10 pages).
Notification of Office Action and Search Report dated Jan. 27, 2021 From the State Intellectual Property Office of the People's Republic of China Re. Application No. 201880045899.5 and its Translation of Office Action Into English. (9 Pages).
Official Action dated Oct. 3, 2019 From the Re. U.S. Appl. No. 15/614,687. (16 pages).
Restriction Official Action dated Apr. 5, 2019 From the Re. U.S. Appl. No. 15/614,687. (6 pages).
Supplementary European Search Report and the European Search Opinion dated Feb. 15, 2021 From the European Patent Office Re. Application No. 18813728.5. (11 Pages).
Jayaraman et al. "Thermo-Mechanical Characterization of Surface-Micromachined Microheaters Using In-Line Digital Holography", Measurement Science and Technology, XP020168495, 21(1): 0153011-015301-25, Published Online Nov. 16, 2009.
Notification of Office Action and Search Report dated Jul. 19, 2021 From the State Intellectual Property Office of the People's Republic of China Re. Application No. 201880045899.5 and its Translation of Office Action Into English. (5 Pages).
Translation dated Jul. 21, 2022 of Notification of Office Action dated Jun. 27, 2022 From the State Intellectual Property Office of the People's Republic of China Re. Application No. 201980071824. 9. (6 Pages).
Restriction Official Action dated Jul. 18, 2022 from Re. U.S. Appl. No. 16/619,499. (5 pages).
Grounds of Reason of Rejection dated Mar. 10, 2023 From the Korean Intellectual Property Office Re. Application No. 10-2020-7000327. (7 Pages).
Notice of Reasons for Rejection dated Nov. 1, 2022 From the Japan Patent Office Re. Application No. 2019-568108. (3 Pages).
Translation dated Nov. 16, 2022 of Notice of Reason for Rejection dated Nov. 1, 2022 From the Japan Patent Office Re. Application No. 2019-568108. (4 pages).
Official Action dated Feb. 16, 2023 From the Re. U.S. Appl. No. 16/619,499. (38 Pages).
Translation dated Apr. 7, 2023 of Grounds of Reason of Rejection dated Mar. 10, 2023 From the Korean Intellectual Property Office Re. Application No. 10-2020-7000327. (6 Pages).

* cited by examiner

METHODS AND SYSTEMS OF HOLOGRAPHIC INTERFEROMETRY

RELATED APPLICATION REPLATED APPLICATION

This application is a National Phase of PCT Patent Application No. PCT/IL2019/051174 having International filing date of Oct. 30, 2019, which claims the benefit of priority under 35 USC § 119(e) of U.S. Provisional Patent Application No. 62/752,408 filed on Oct. 30, 2018. The contents of the above applications are all incorporated by reference as if fully set forth herein in their entirety.

FIELD AND BACKGROUND OF THE INVENTION

The present invention, in some embodiments thereof, relates to holographic imaging and, more particularly, but not exclusively, to methods and systems of three dimensional measurements using holographic interferometry.

Holographic imaging, which records amplitude and phase information of light arriving from an object (such as integrated circuit (IC) semiconductor wafers or flat panel display (FPD), may be used in microscopy to reconstruct the 3D profile of the object, i.e. the relative height of each point in the image.

Some methods use zero angle between the object and reference image, and a phase scanning mechanism, which, combined with multiple image acquisitions at the same object location, give the possibility to separate between the phase and amplitude information. These methods may even use illumination with a very short coherent length. However, such schemes are generally too slow for applications in which the object needs to be laterally scanned in limited time, such as wafer inspection.

In order to achieve fast lateral scanning of the object using holographic interferometry, it is desired to be able to extract the phase information from a single image. This may be done by introducing a non-zero angle between the object beam and the reference beam, and the use of coherent illumination. The spatial frequency in the image depends on the angle between the object imaging optical axis and the reference imaging optical axis. When the object has for example a raised surface, the interference lines shift. By analyzing the images, it is possible to extract the phase change of the interference lines, and from that deduce the height of the features in the object.

To be able to extract the phase information from the image, the interference lines need to be with a density low enough so that the camera pixelization will not average them out, but high enough to have a good lateral resolution of the phase information (this resolution is typically one cycle of interference lines).

SUMMARY OF THE INVENTION

According to an aspect of some embodiments of the present invention there is provided a holographic interferometer, comprising: an imaging device capturing an interference pattern created by at least two polarized light beams; a structured phase retardation element located in an optical path of at least one polarized light beam of the at least two polarized light beams; and a polarizer located between the imaging device and the structured phase retardation element, the polarizer projects each polarization of each of the at least two polarized light beams on a single axis to create the interference pattern on the imaging device.

Optionally, the at least two polarized light beams are created by collecting light beams reflecting from an object at different angles and polarizing each of the light beams differently.

Optionally, the at least two polarized light beams are differently polarized and are illuminating an object at different angles.

Optionally, the structured phase retardation element is a transmitting structured phase retardation element.

Optionally, the structured phase retardation element is a reflecting structured phase retardation element.

Optionally, the structured phase retardation element is a birefringence phase retardation element.

Optionally, the structured phase retardation element includes a periodic structure.

Optionally, the polarizer is a linear polarizer.

Optionally, the holographic interferometer further comprises at least one half-wavelength waveplate.

More optionally, the at least one half-wavelength waveplate includes a waveplate disk positioned inside a waveplate ring.

Optionally, the at least two polarized light beams are originated from a polarized light source.

Optionally, the at least two polarized light beams are originated from an ambient light source and are polarized by a polarizer.

Optionally, the at least two polarized light beams are created by at least two apertures in an apertures plate.

Optionally, the holographic interferometer further comprises at least one polarized beam splitter which splits an original light beam into the at least two polarized light beams.

More optionally, the at least one polarized beam splitter splits the original beam into the at least two polarized light beams having two orthogonal polarizations.

Optionally, the holographic interferometer further comprises at least one mirror which changes the distance of at least one light beam of the at least two polarized light beams from an original optical axis of the original light beam to create a different angle of incident of each of the at least two polarized light beams on an object.

According to an aspect of some embodiments of the present invention there is provided a method of setting a holographic interferometer, comprising: positioning an imaging device for capturing an interference pattern created by at least two polarized light beams; positioning a structured phase retardation element in an optical path of at least one polarized light beam of the at least two polarized light beams; and positioning a polarizer in front of the imaging device, so the polarizer projects the polarizations of the at least two polarized light beams on a single axis.

Unless otherwise defined, all technical and/or scientific terms used herein have the same meaning as commonly understood by one of ordinary skill in the art to which the invention pertains. Although methods and materials similar or equivalent to those described herein may be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWINGS

Some embodiments of the invention are herein described, by way of example only, with reference to the accompanying drawings. With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

In the drawings.

DESCRIPTION OF EMBODIMENTS OF THE INVENTION

Figure 1A:
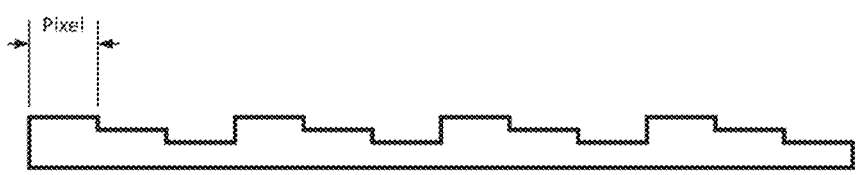
FIGS. 1A and 1B are schematic section view and front view illustrations, respectively, of an exemplary structured phase retardation element, according to some embodiments of the present invention.

The present invention, in some embodiments thereof, relates to holographic imaging and, more particularly, but not exclusively, to methods and systems of three dimensional measurements using holographic interferometry.

To enable local phase analysis of an interference image from a holographic interferometer it is common to focus the interfering image planes at an angle between them, so that the interference lines are dense enough to enable the estimation of the relative phase difference with a good lateral resolution. However, this usually places a requirement on the coherence length of the used light, to be long enough so that the interference lines will have a good contrast on the whole camera field.

As an example, for an imaging device (camera) having 3000 pixels (in an axis normal to the interference lines), interference lines density of 3 pixels, and assuming the path difference between the interfering images is 0 at the center of the camera field, the coherence length would preferably be larger than (3000/3)/2*Lambda, to have a good contrast of the interference lines at the edge of the camera. Lambda here is the center wavelength of the used light. This lower limit on the coherent length places an upper limit on the bandwidth of the used light. Removing this limitation may be advantageous for various applications.

According to some embodiments of the present invention, there is provided a holographic interferometer having a structured phase retardation element at a conjugate field plane of one of the interfering images. The structured phase retardation element generates the interference lines from which the relative phase difference is inferred. This removes the need to place the interfering images at an angle with respect to each other, thus greatly reduce the required coherence length for getting a good contrast of interference lines across the whole image captured by the imaging device, and enabling a broadband light utilization. The holographic interferometer also includes a polarizer, between the imaging device and the structured phase retardation element, which projects the polarization of both polarized light beams on the same axis to create an interference pattern between them on the imaging device.

In optical schemes where the interfering images have essentially orthogonal polarizations, a birefringent element may be used to simplify the optical scheme and make the system compact. The birefringent element may be structured (such as a patterned retarder) or dynamically controlled.

Before explaining at least one embodiment of the invention in detail, it is to be understood that the invention is not necessarily limited in its application to the details of construction and the arrangement of the components and/or methods set forth in the following description and/or illustrated in the drawings and/or the Examples. The invention is capable of other embodiments or of being practiced or carried out in various ways.

Figure 1B:
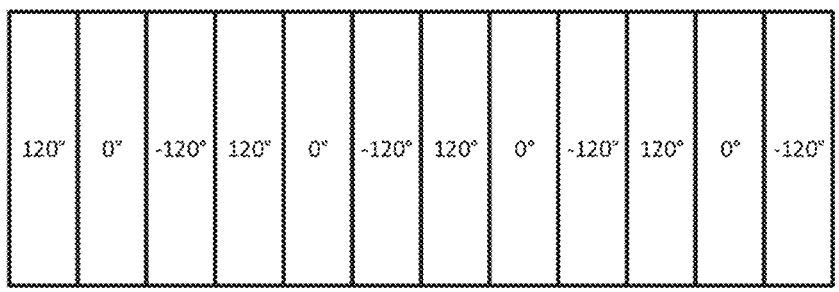

Referring now to the drawings, FIGS. 1A and 1B are schematic section view and front view illustrations, respectively, of an exemplary structured phase retardation element, according to some embodiments of the present invention. The periodic structure retards the image at different pixel lines by some different known phases. The pixel lines are preferably parallel to the interference lines. In this example, where the interference lines density is 3 pixels, the preferred relative phase retardation values would be +120, 0 and −120 degrees. As light goes through the different widths of material, the phase is retarded by different amount. In this example, the phase of light passing through the thick parts of the element is retarded by 120 degrees relative to the phase of light passing through the medium-thickness parts of the element, and the phase of light passing through the thin parts of the element is retarded by −120 degrees relative to the phase of light passing through the medium-thickness parts of the element.

Many other designs for this element are possible, to optimize for different applications requirements and constraints. The period of the structure may be any number of pixels, or even a non-integer number of pixels.

Figure 2:
FIG. 2 is a schematic front view illustration of a unit cell of an exemplary structured phase retardation element having a structure which is periodic in both axes, according to some embodiments of the present invention.

Reference is now made to FIG. 2, which is a schematic front view illustration of a unit cell of an exemplary structured phase retardation element having a structure which is periodic in both axes, according to some embodiments of the present invention. Each section of the structured phase retardation element changes the phase of the light passing through by a different amount.

Figure 3:
FIG. 3 is a schematic side view illustration of an exemplary structured phase retardation element having a continuous structure, according to some embodiments of the present invention.

Reference is also made to FIG. 3, which is a schematic side view illustration of an exemplary structured phase retardation element having a continuous structure, according to some embodiments of the present invention.

The arrangement of the phase retardations may be aligned to the axes of the pixel arrangement in the imaging device, or may not be aligned to the axes of the pixel arrangement in the imaging device. The structured phase retardation element may be a transmitting element or a reflecting element, as will be shown in the below exemplary optical designs. A structured phase retardation element having a small period of the periodic structure may be preferable, in order to be able to extract a dense phase-difference information.

A transmitting structured phase retardation element may be made from any suitably transmitting material such as fused silica, BK7 optical glass, plastic and the like. The material may be processed to the desired structure using any kind of shaping method, for example etching, molding, and the like. A reflective structured phase retardation element may be processed from any suitable material to obtain the required structure, and then, when needed, coated with reflective coating.

Figure 4:
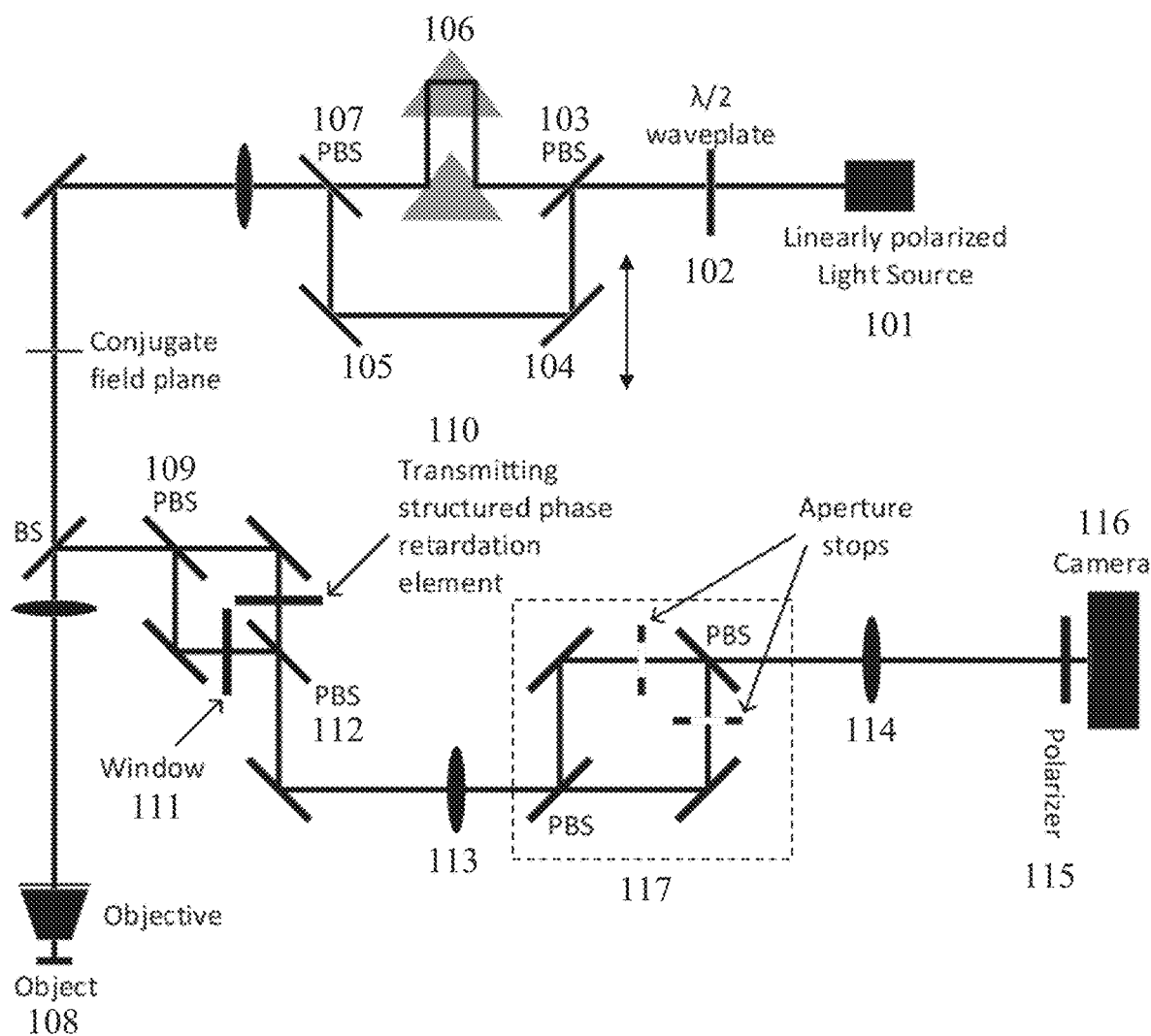
FIG. 4 is a schematic illustration of an exemplary optical setup of a holographic interferometer that uses a transmitting structured phase retardation element, according to some embodiments of the present invention.

Reference is now made to FIG. 4, which is a schematic illustration of an exemplary optical setup of a holographic interferometer that uses a transmitting structured phase retardation element, according to some embodiments of the present invention.

Light originating from a linearly polarized light source 101 passes through a half-wavelength ($\lambda/2$) waveplate 102 that sets the polarization direction of the light to be 45 degrees to the drawing plane. In this example linear polarizations are used, however other polarizations may also be used. Light source 101 may be, for example, light-emitting diode (LED), continuous wave (CW) lasers, and/or pulsed lasers.

The light is then split by a polarizing beam splitter 103 into two polarized light beams. One of the split polarized light beams is displaced from the other split polarized light beam, by use of two mirrors 104 and 105. Mirrors 104 and 105 are displaced (along an axis shown by an arrow) to change the distance of one beam from the original optical axis. This creates an angle of incident of the beam on the object which is different from the other beam. Different displacements of the one beam from the optical axis, translate to different incident illumination angles on the object.

Displacement of prism 106 (along the same axis) optionally compensates for the path length difference between the beams. The beams are combined by a polarizing beam splitter 107. The two illuminating beams have different, optionally orthogonal polarizations.

The combined beams are reflected from an object 108 and are split by the polarizing beam splitter 109. At the conjugate field plane of one of the beams, a transmitting structured phase retardation element 110 is placed, while in the conjugate field plane of the second beam an optical window 111 is placed. When the optical window 111 has phase retardation which is not equal to the average phase retardation of the structured phase retardation element 110, additional compensation may be required, for example by further adjustment of prism 106. The beams are combined again by a polarizing beam splitter 112. Two lenses 113 and 114 create an optical relay that re-images the conjugate field planes on an imaging device, such as camera 116. A linear polarizer 115, oriented at 45 degrees to the drawing plane, projects the two polarizations on the same axis, so that they interfere on the camera 116. The imaging device may be a light sensor, film, camera and/or any other type of light capturing device.

Optionally, an optional filtering module 117 enables individual filtering of the collection angle range for each of the polarizations. This filtering module 117 may include, for example, polarized beam splitters and aperture stops. This may be useful when dealing with curved or diffusive surfaces.

The optical path difference between the two beams depends on the distance of the object from the system focal plane, as well as on the wavelength and angles between the optical axis and the object. By analyzing the phase of the interference pattern on the camera, the distance to the object can be calculated, and the object may be profiled.

For some applications, it may be beneficial to control the phase retardation of the structured phase retardation element dynamically. In this case, the phase retardation element may retard the phase uniformly across the image field. Images may then be captured by the camera 116 for different phase retardation states of the element, and the local phase analysis may be using the same pixel from different captured images to calculate the local phase difference.

Optionally, additional beam splitters and/or beam sharers are added to utilize more than two interference images. This may be useful to increase the dynamic range of height measurement or address some challenges of complex objects, such as profiling objects with transparent layer.

Figure 5:
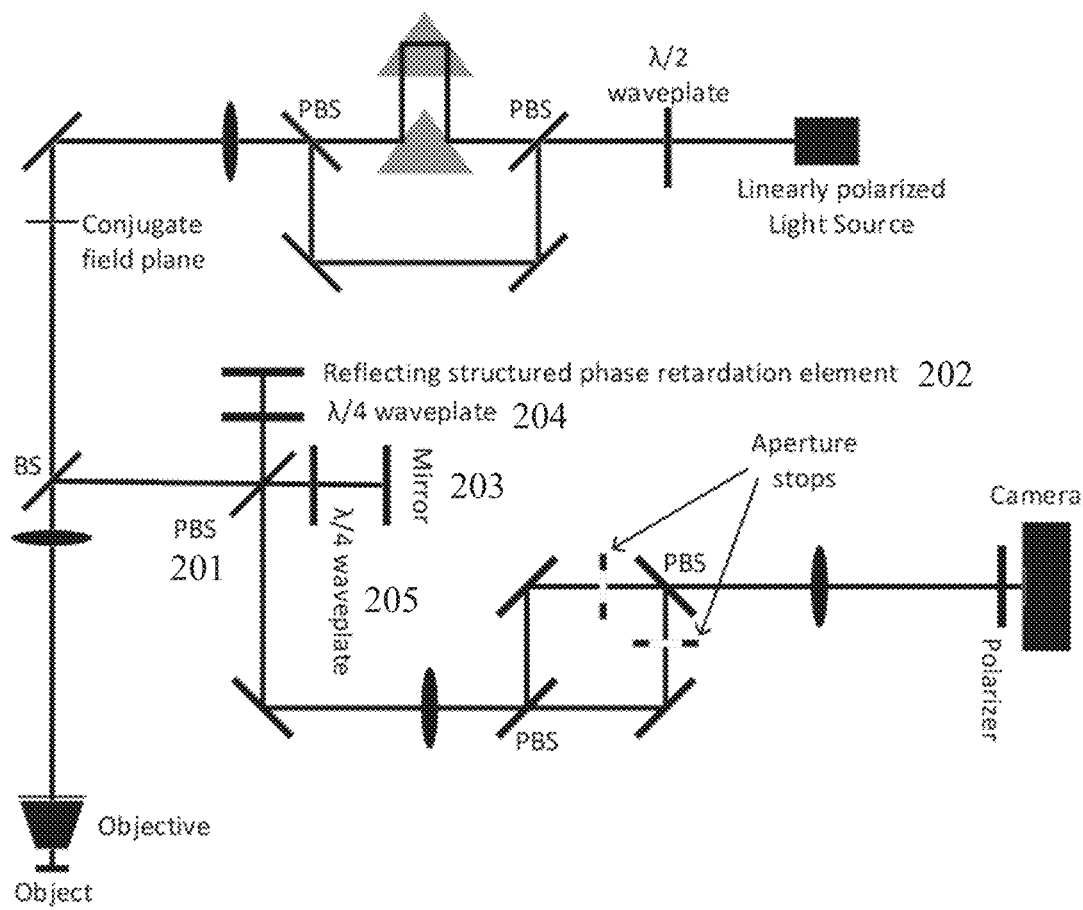
FIG. 5 is a schematic illustration of an exemplary optical setup of a holographic interferometer that uses a reflective structured phase retardation element, according to some embodiments of the present invention.

Reference is now made to FIG. 5, which is a schematic illustration of an exemplary optical setup of a holographic interferometer that uses a reflective structured phase retardation element, according to some embodiments of the present invention.

The combined polarized beams are reflected from an object as shown at FIG. 4. A polarizing beam splitter 201 then splits the polarized beams. At the conjugate field plane of one of the beams, a reflective structured phase retardation element 202 is placed, while in the conjugate field plane of the second beam a mirror 203 is placed. $\lambda/4$ waveplates 204 and 205 are placed in the path of each of the polarized beams. Each of the polarized beams passes twice through the $\lambda/4$ waveplate, which is added to an equivalent of a $\lambda/2$ waveplate.

After each of the polarized beams pass through a waveplate once, reflected by the reflective structured phase retardation element 202 or by the mirror 203, and pass through a waveplate a second time, the polarizing beam splitter 201 combines the polarized beams back.

Figure 6:
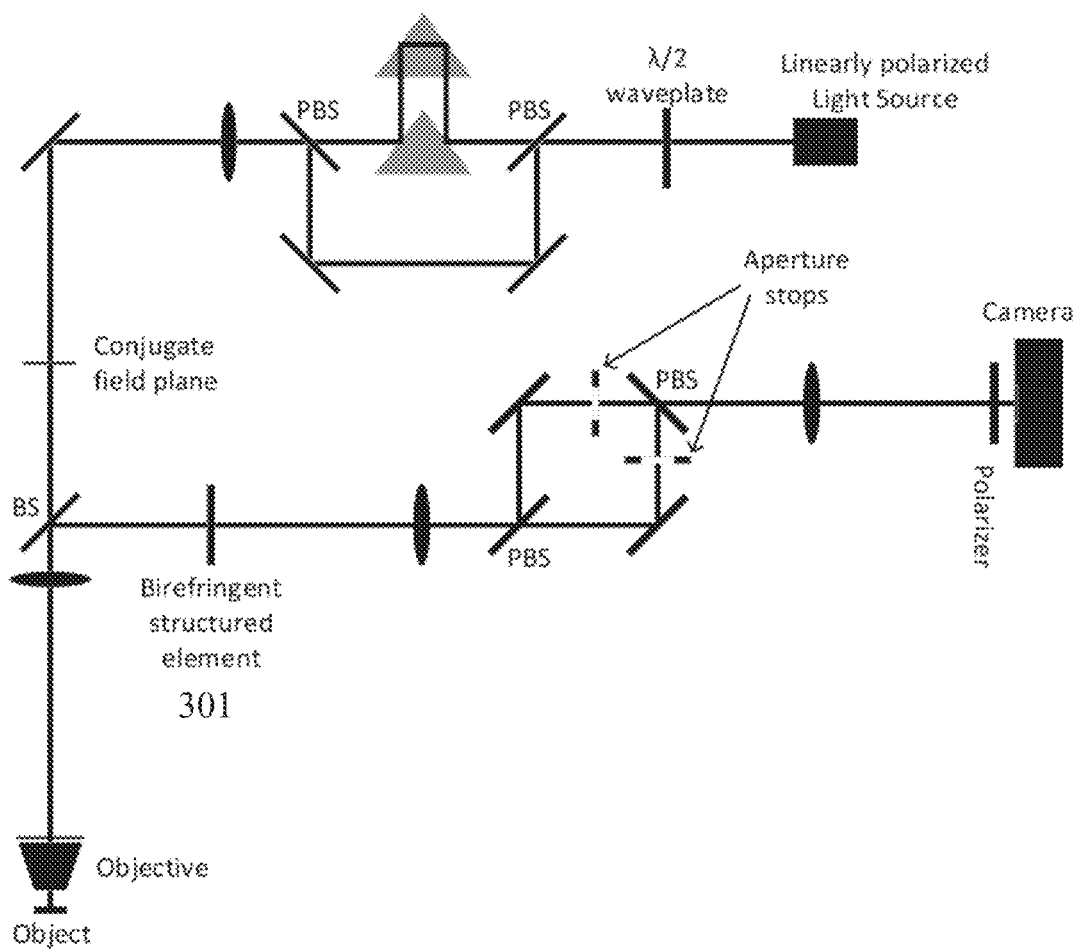
FIG. 6 is a schematic illustration of an exemplary optical setup of a holographic interferometer that uses a birefringence structured phase retardation element, according to some embodiments of the present invention.

Reference is now made to FIG. 6, which is a schematic illustration of an exemplary optical setup of a holographic interferometer that uses a birefringence structured phase retardation element, according to some embodiments of the present invention. A birefringence structured phase retardation element 301 is places at the conjugate field plane. The birefringence structured phase retardation element 301 creates the required pattern of relative phase retardation between the two beams. Each of the two different refractive indices of the birefringence element retards differently one of the two light beams. The structure of the birefringence element may be the same as presented above, for example in the examples given in FIGS. 1A-B, 2 and 3. Examples for the element material are quartz, rutile and thin films such as used in film-type pattern retarders.

This setup does not require additional elements, for example for splitting and combining the light beams.

For some applications it is important to minimize the physical volume of the optical system. An example to such application is a camera in a cellular phone or other mobile devices.

Figure 7:
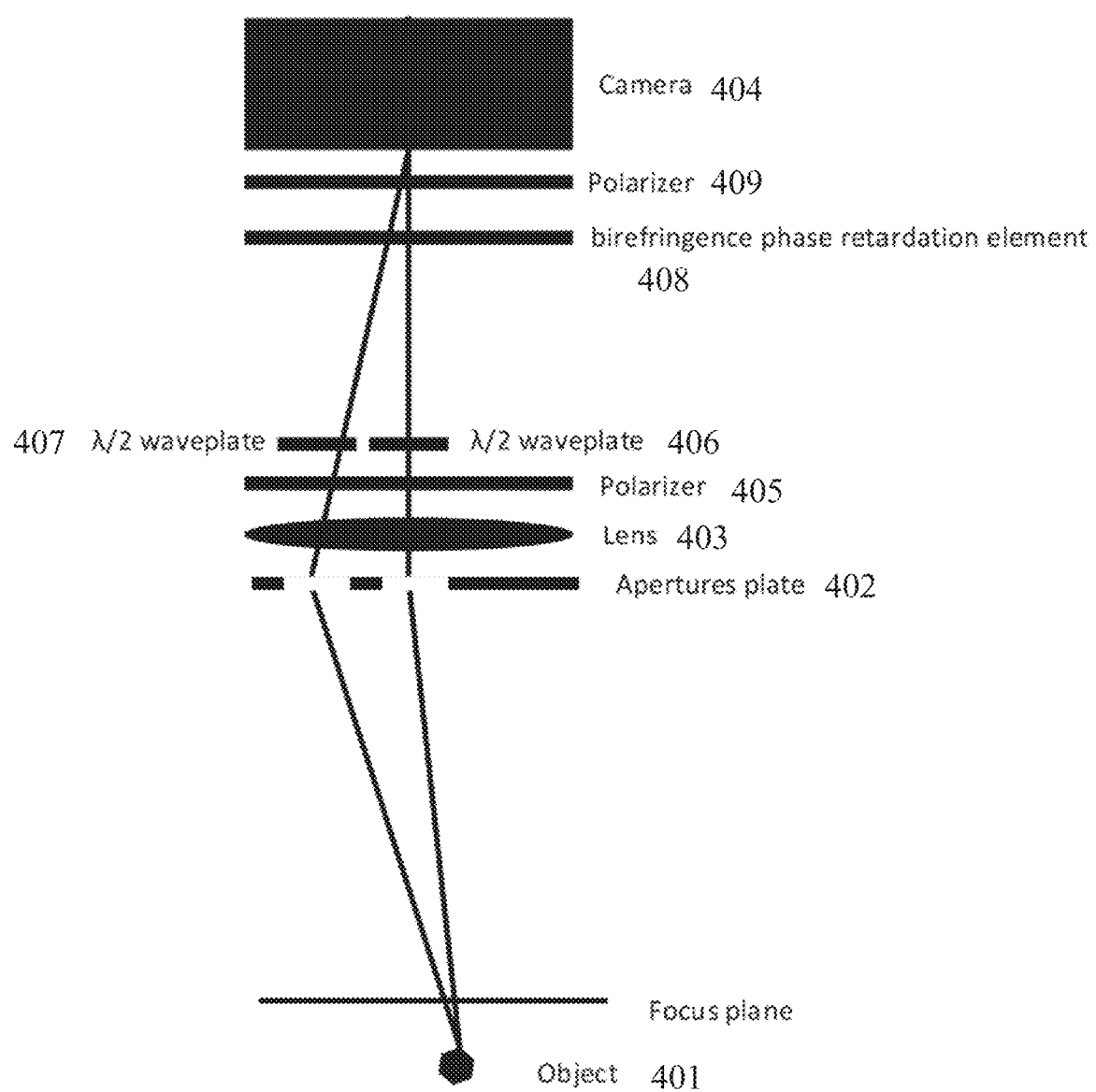
FIG. 7 is a schematic illustration of an exemplary optical setup of a compact holographic interferometer that uses external light, according to some embodiments of the present invention.

Reference is now made to FIG. 7, which is a schematic illustration of an exemplary optical setup of a compact holographic interferometer that uses external light, according to some embodiments of the present invention. This holographic interferometer system may be used with a broadband, ambient or added light for 3D surface profiling or range finding applications. For this design, the phase retardation element is preferably birefringent, because of size considerations.

Light that is reflected from an object 401 is collected via two apertures on an aperture plate 402. A lens 403 images a focal plane on a camera 404. A polarizer 405 which is oriented at 45 degrees to the drawing plane filters the incoming light to a single polarization. Two λ/2 waveplates 406 and 407 rotate the filtered light to two linear, preferably orthogonal polarizations. The two waveplates are placed at different degrees to the drawing plane. For example, to get the polarizations oriented perpendicular and in parallel to the drawing plane, waveplate 406 is oriented at 67.5 degrees to the drawing plane (therefore rotating the beam polarization to 90 degrees) and waveplate 407 is oriented at 22.5 degrees to the drawing plane (therefore rotating the beam polarization to 0 degrees). For another example, in which the polarizer 405 is oriented at 0 degrees to the drawing plane, the waveplates may be oriented at 0 and 45 degrees to the drawing plane. The total optical path difference between the two interfering beams needs to be shorter than the coherence length, so it may be preferable to cut the two waveplates from a single component. Alternatively, a single element, such as a patterned retarder, may also be used instead of the two waveplates. A structured birefringent retardation element 408 is placed near the camera 404 to enable a local phase difference measurement of the light collected from the two apertures. A linear polarizer 409 which is oriented at 45 degrees to the drawing plane projects the two polarizations on the same axis, so that they interfere on the camera 404.

As in the setups described above, the birefringent retardation element may be a dynamically controlled element, instead or in addition of being structured. For example, a Pockels cell may be used.

The phase difference between the images formed via the two apertures depends on the distance of the object from the focal plane, and for the system of FIG. 7 it may be approximated by:

$$\Delta\varphi = \frac{2\pi}{\lambda}\left(\frac{d\cos\theta}{L}\right)^2\frac{\Delta L}{2} \quad \text{(I)}$$

where $\Delta\varphi$ is the phase difference, $\lambda$ is the center wavelength, d is the distance between the two apertures centers, $\theta$ is the angular field position of the object, L is the distance from the center of the system pupil to the focus point associated with the field position, and $\Delta L$ is the distance between the object and the above point of focus.

Figure 8:
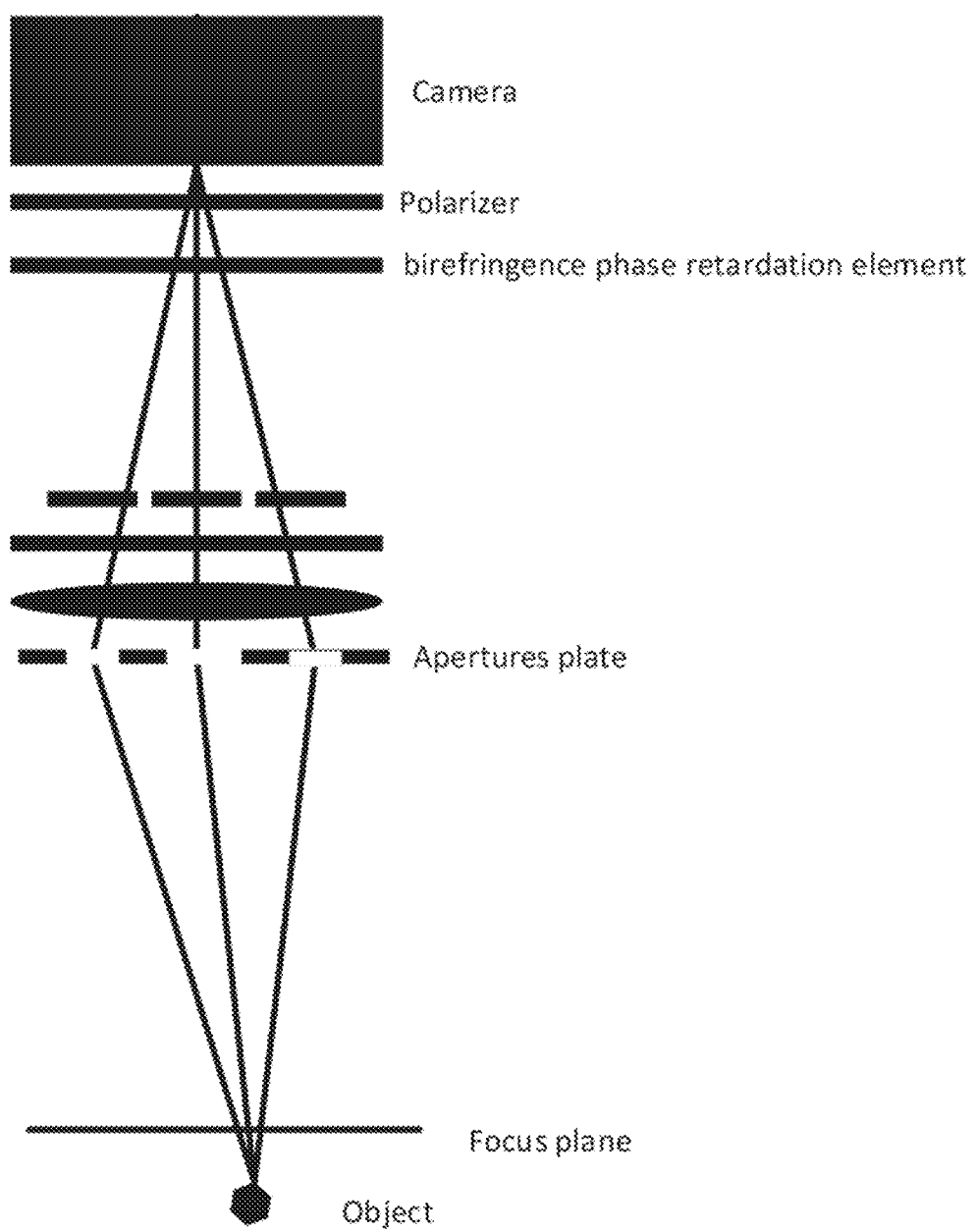
FIG. 8 is a schematic illustration of an exemplary optical setup of a compact holographic interferometer that uses a central aperture with two smaller side apertures, according to some embodiments of the present invention.

Other arrangements of the split between the interfering beams are possible. For example, this may be done by using a central aperture with two smaller side apertures that are arranged symmetrically around the central aperture. Reference is made to FIG. 8, which is a schematic illustration of an exemplary optical setup of a compact holographic interferometer that uses such apertures, according to some embodiments of the present invention.

Figure 9A:
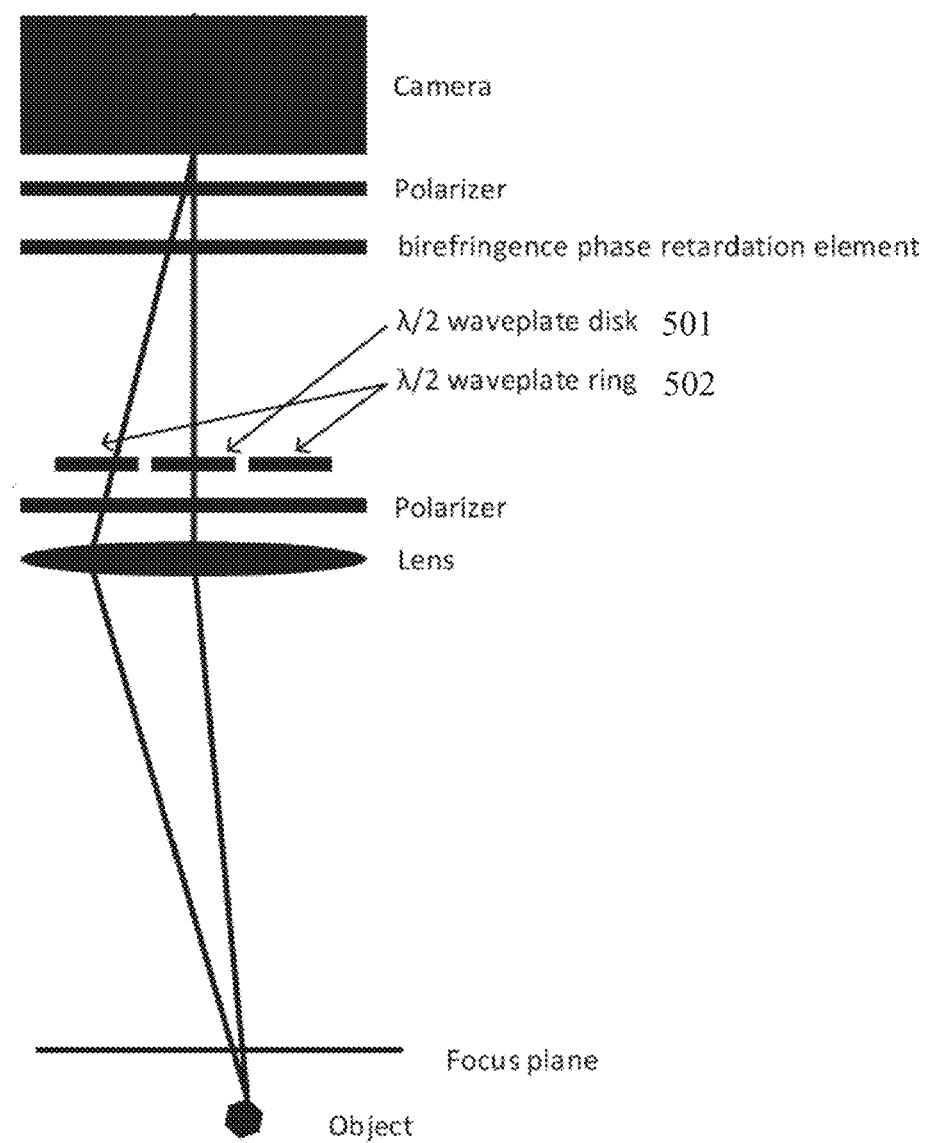
FIG. 9A is a schematic illustration of an exemplary optical setup of a compact holographic interferometer without an aperture plate, according to some embodiments of the present invention.
Figure 9B:
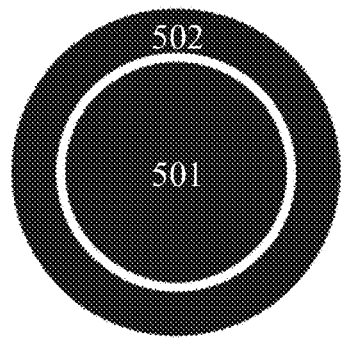
FIG. 9B is a schematic illustration of a front view of two concentric waveplates, according to some embodiments of the present invention.

Reference is now made to FIG. 9A, which is a schematic illustration of an exemplary optical setup of a compact holographic interferometer without an aperture plate, according to some embodiments of the present invention. In this setup, two concentric waveplates are used, a waveplate disc 501 and a waveplate ring 502. Reference is also made to FIG. 9B, which is a schematic illustration of a front view of two concentric waveplates, according to some embodiments of the present invention. The full collection aperture is split between the two interfering beams. One beam is created by the center waveplate disc 501 (which is oriented at 67.5 degrees to the drawing plane), while the other is created by the external waveplate ring 502 (which is oriented at 22.5 degrees to the drawing plane). In this example the light collection and lateral resolution, for a given lens diameter, may be better than the example in FIG. 7, but the effective distance between the apertures (d in equation I) may be smaller, hence the depth resolution may be lower. Other arrangements of the split between the interfering beams are possible.

For some applications, it may be beneficial to use a setup with multiple cameras, each with a different retardation difference between the interfering images (per field point).

Optionally, some of the optical components and/or parameters, such as the apertures shift angles, position, and/or size, lens focal distance, camera position, the focus and/or magnification of the optical system and/or any other parameter are changed and/or dynamically controlled in order to produce multiple different images. This may be beneficial for some applications. Optionally, the components and/or parameters are controlled by a computer.

Optionally, other polarizations may be used instead of linear, such as circular, with an appropriate adaptation of the optical design. Optionally, the optical elements near the camera (in this case a polarizer and the birefringent phase retardation element) are integrated with the camera itself, which may be beneficial for some applications, for example to reduce size and cost. For example, the polarizer may be implemented directly into the camera's imaging sensor pixels by use of a layer of metallic line grid, while the structured birefringence element may be implemented as an etched TiO2 crystal layer.

Figure 10:
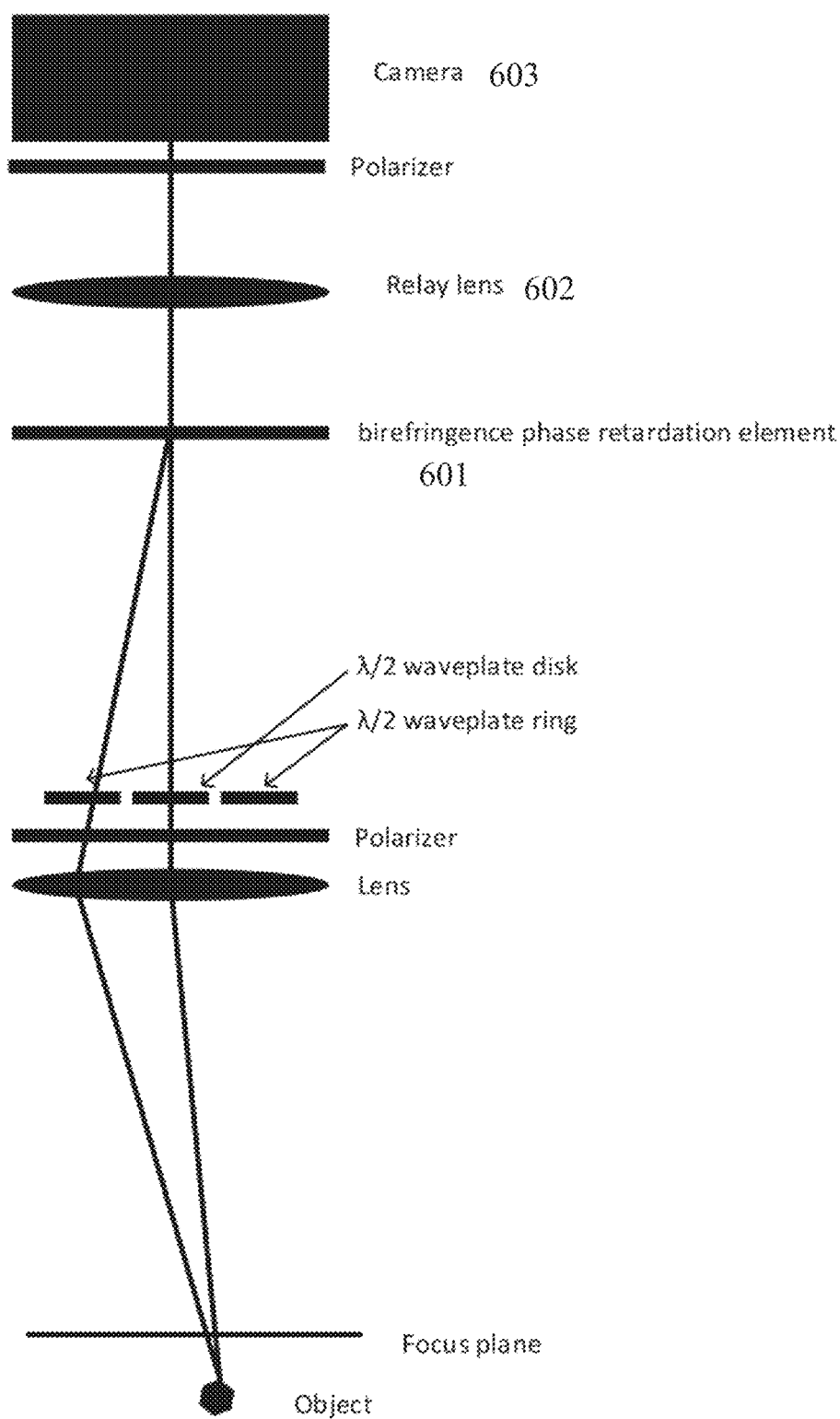
FIG. 10 is a schematic illustration of an exemplary optical setup of a compact holographic interferometer that uses a relay lens, according to some embodiments of the present invention.
Figure 11:
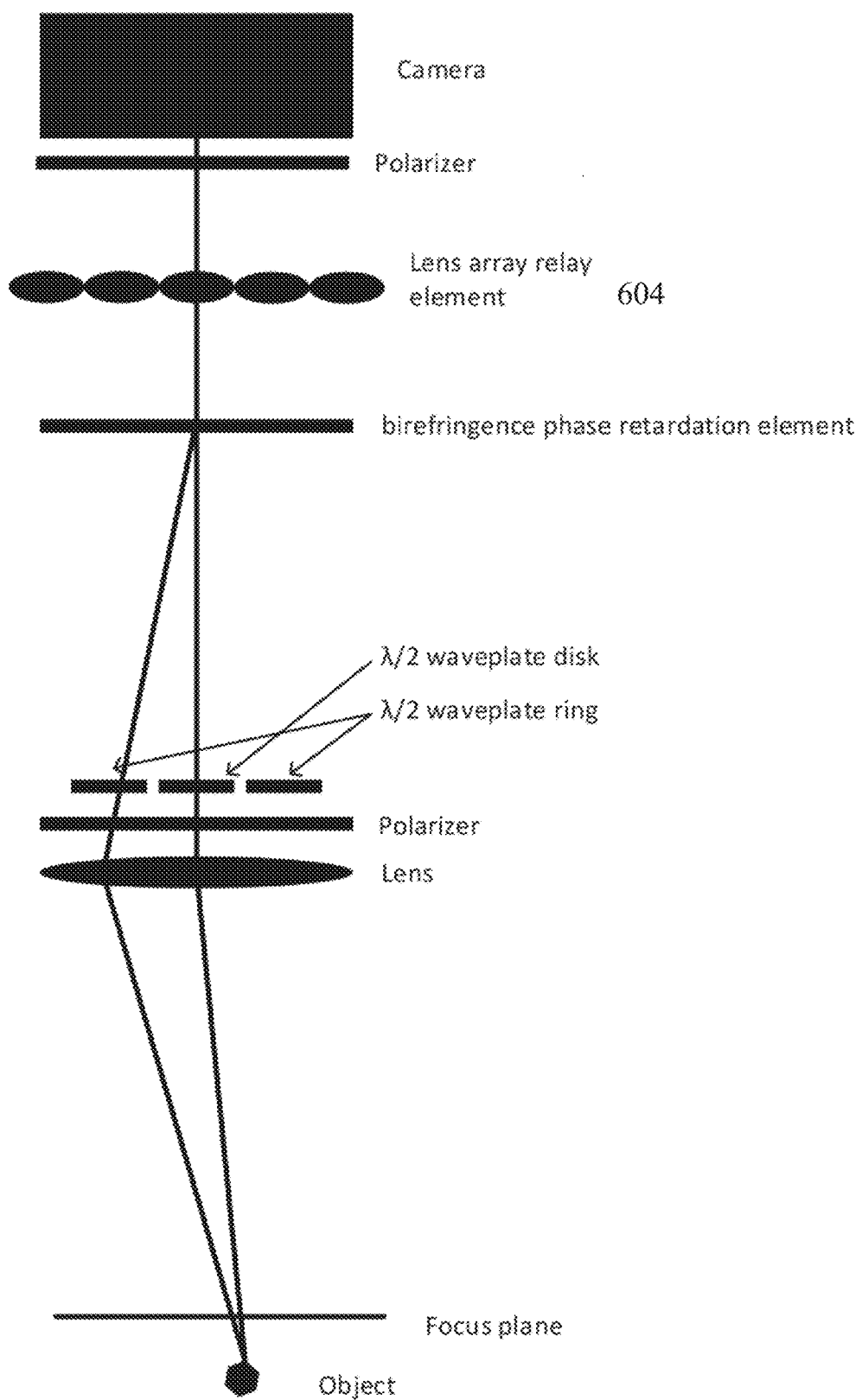
FIG. 11 is a schematic illustration of an exemplary optical setup of a compact holographic interferometer that uses a lens array relay element, according to some embodiments of the present invention.

Reference is now made to FIG. 10, which is a schematic illustration of an exemplary optical setup of a compact holographic interferometer that uses a relay lens, according to some embodiments of the present invention. The birefringent phase retardation element 601 is placed in the conjugate field plane. A relay lens 602 re-images the plane conjugate field plane on the camera 603. Alternatively, a lens array relay element 604 is used to relay the conjugate field plane on the camera 603, as shown in FIG. 11, according to some embodiments of the present invention. One of the possible benefits of this design is a shorter system length, as the working distance of the lens array can be much shorter than the relay lens.

Figure 12A:
FIGS. 12A and 12B are schematic section view and front view illustrations, respectively, of an exemplary structured phase retardation element combined with lens array, according to some embodiments of the present invention.
Figure 12B:
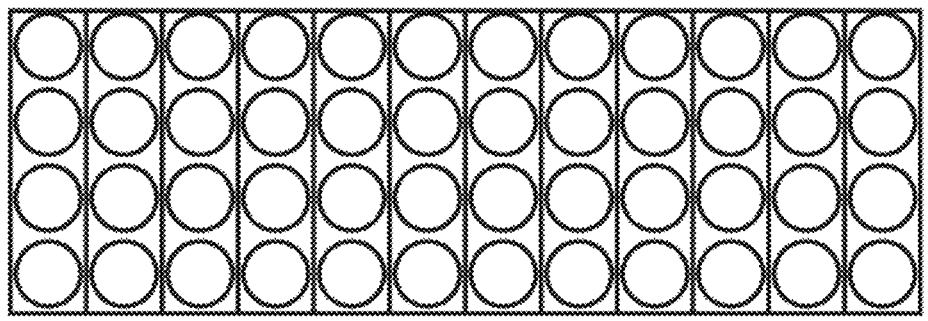

Alternatively, the lens array element 604 may be combined with the structured retardation element 601 to a single element. Reference is made to FIGS. 12A and 12B, which are schematic section view and front view illustrations, respectively, of an exemplary structured phase retardation element combined with lens array, according to some embodiments of the present invention.

Figure 13:
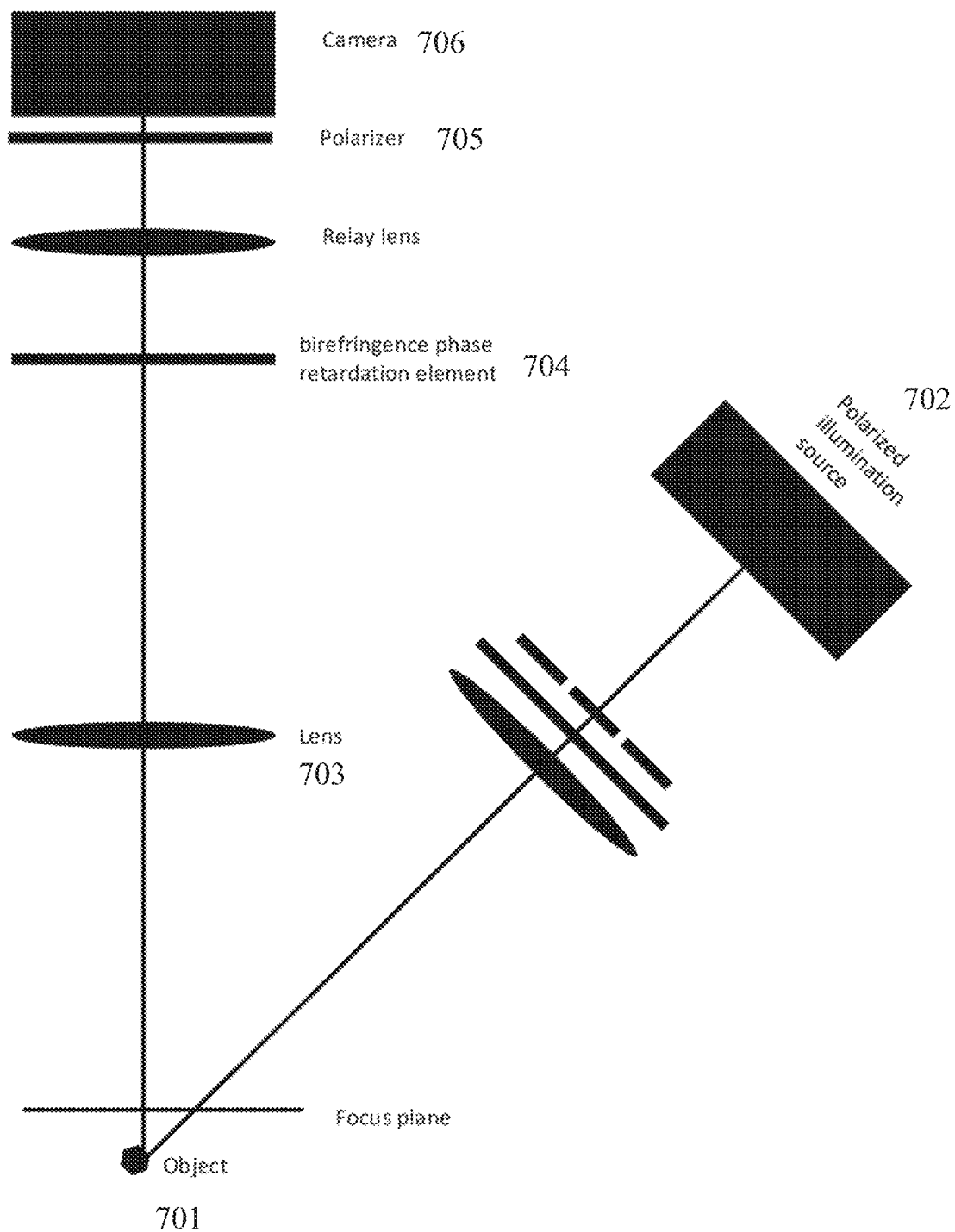
FIG. 13 is a schematic illustration of an exemplary optical setup of a holographic interferometer that uses controlled illumination, according to some embodiments of the present invention.
Figure 14:
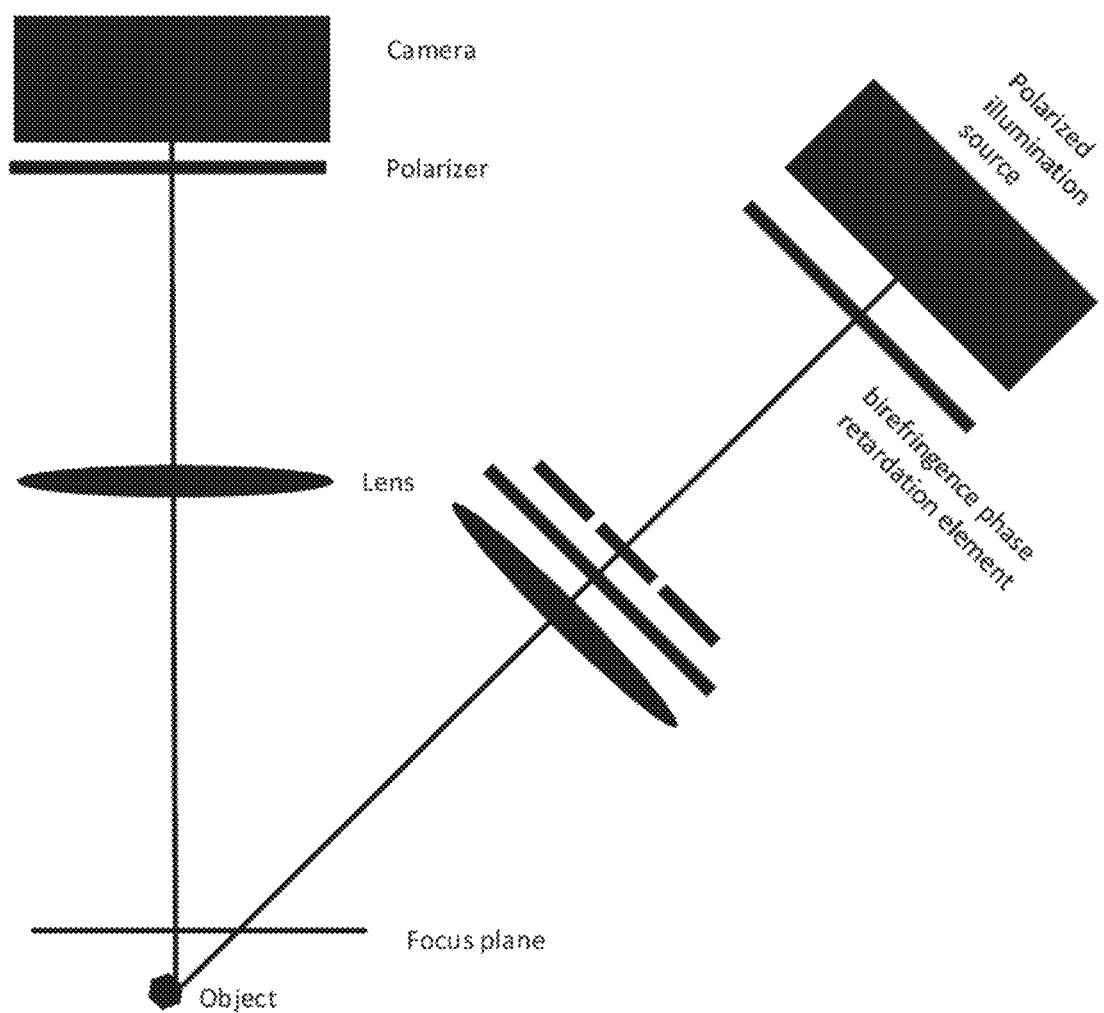
FIG. 14 is a schematic illustration of an exemplary optical setup of a holographic interferometer that uses controlled illumination with a birefringent phase retardation element, according to some embodiments of the present invention.

Reference is now made to FIG. 13, which is a schematic illustration of an exemplary optical setup of a holographic interferometer that uses controlled illumination, according to some embodiments of the present invention. The controlled illumination is used to generate the phase difference that depends on the topography or Z location (distance) of an object 701. In this example, a linearly polarized illumination source 702 is used. The object 701 is illuminated by two preferably orthogonal polarizations, where on each point in the object the phase difference between the polarizations depends on the point Z location. A lens 703 collects the scattered light from the object 701. In this example a structured birefringent retardation element 704 is placed at the conjugate field plane, and then the field plane is re-imaged on the camera. The polarizer 705 (which is oriented at 45 degrees to the drawing plane) projects the two polarizations on the same axis, to interfere on the camera 706. Optionally, a single lens is used for both the illumination and collection sub-systems, for example by using a beam splitter. Reference is also made to FIG. 14, which is a schematic illustration of an exemplary optical setup of a holographic interferometer that uses controlled illumination with a birefringent phase retardation element, according to some embodiments of the present invention. When the birefringent phase retardation element is used in the illumination, it is possible to use existing imaging systems, with the sole addition of a polarizer that is positioned before the camera.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant interferometers will be developed and the scope of the term interferometry is intended to include all such new technologies a priori.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the invention may include a plurality of "optional" features unless such features conflict.

Throughout this application, various embodiments of this invention may be presented in a range format. It should be understood that the description in range format is merely for convenience and brevity and should not be construed as an inflexible limitation on the scope of the invention. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals therebetween.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable subcombination or as suitable in any other described embodiment of the invention. Certain features described in the context of various embodiments are not to be considered essential features of those embodiments, unless the embodiment is inoperative without those elements.

Although the invention has been described in conjunction with specific embodiments thereof, it is evident that many alternatives, modifications and variations will be apparent to those skilled in the art. Accordingly, it is intended to embrace all such alternatives, modifications and variations that fall within the spirit and broad scope of the appended claims.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present invention. To the extent that section headings are used, they should not be construed as necessarily limiting.

In addition, any priority document(s) of this application is/are hereby incorporated herein by reference in its/their entirety.

What is claimed is:

1. A holographic interferometer, comprising:
    an imaging device capturing an interference pattern created by at least two polarized light beams;
    a structured phase retardation element located in an optical path of at least one polarized light beam of the at least two polarized light beams;
    a polarizer located between the imaging device and the structured phase retardation element, the polarizer projects each polarization of each of the at least two polarized light beams on a single axis to create the interference pattern on the imaging device; and
    at least one half-wavelength waveplate placed in a path of each of the at least two polarized light beams;
    wherein the at least one half-wavelength waveplate includes a waveplate disk positioned inside a waveplate ring.

2. The holographic interferometer of claim 1, wherein the at least two polarized light beams are created by collecting light beams reflecting from an object at different angles and polarizing each of the light beams differently.

3. The holographic interferometer of claim 1, wherein the at least two polarized light beams are differently polarized and are illuminating an object at different angles.

4. The holographic interferometer of claim 1, wherein the structured phase retardation element is a transmitting structured phase retardation element.

5. The holographic interferometer of claim 1, wherein the structured phase retardation element is a reflecting structured phase retardation element.

6. The holographic interferometer of claim 1, wherein the structured phase retardation element is a birefringence phase retardation element.

7. The holographic interferometer of claim 1, wherein the structured phase retardation element includes a periodic structure.

8. The holographic interferometer of claim 1, wherein the polarizer is a linear polarizer.

9. The holographic interferometer of claim 1, wherein the at least two polarized light beams are originated from a polarized light source.

10. The holographic interferometer of claim 1, wherein the at least two polarized light beams are originated from an ambient light source.

11. The holographic interferometer of claim 1, wherein the at least two polarized light beams are created by at least two apertures in an apertures plate.

12. The holographic interferometer of claim 1, further comprising:
    at least one polarized beam splitter which splits an original light beam into the at least two polarized light beams.

13. The holographic interferometer of claim 12, wherein the at least one polarized beam splitter splits the original beam into the at least two polarized light beams having two orthogonal polarizations.

14. The holographic interferometer of claim 1, further comprising:
    at least one mirror which changes the distance of at least one light beam of the at least two polarized light beams from an original optical axis of the original light beam to create a different angle of incident of each of the at least two polarized light beams on an object.

15. A method of setting a holographic interferometer, comprising:
    positioning an imaging device for capturing an interference pattern created by at least two polarized light beams;
    positioning a structured phase retardation element in an optical path of at least one polarized light beam of the at least two polarized light beams;
    positioning a polarizer in front of the imaging device, so the polarizer projects the polarizations of the at least two polarized light beams on a single axis; and
    positioning at least one half-wavelength waveplate that includes a waveplate disk inside a waveplate ring in an optical path of a polarized light source from which the at least one polarized light beam is originated.

* * * * *